May 25, 1965  J. J. CAUBET ETAL  3,185,459
DEVICE FOR SUPPORTING A ROTATING BODY
Filed Sept. 30, 1963  5 Sheets-Sheet 1
FIG:1 PRIOR ART
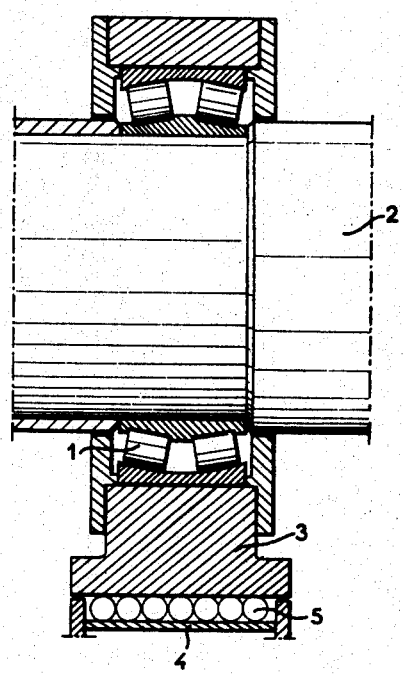
FIG:2 PRIOR ART
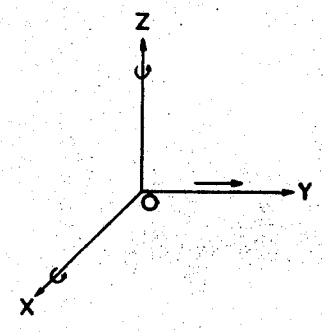
FIG:3
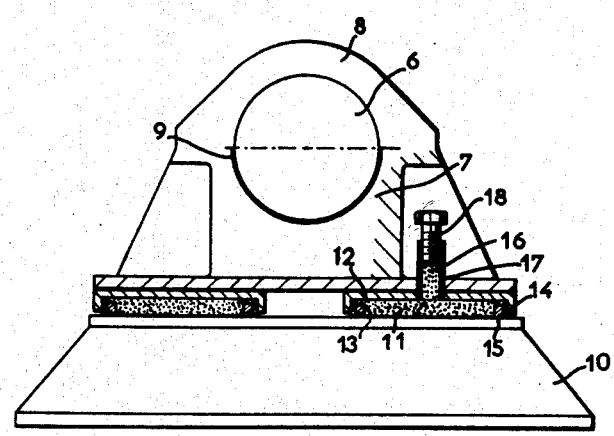
FIG:4
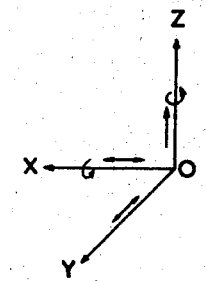
Inventors:
Jacques Jean Caubet
Henri Jacques Grassin
By: Spencer & Kaye
ATTORNEYS May 25, 1965  J. J. CAUBET ETAL  3,185,459
DEVICE FOR SUPPORTING A ROTATING BODY
Filed Sept. 30, 1963  5 Sheets-Sheet 3
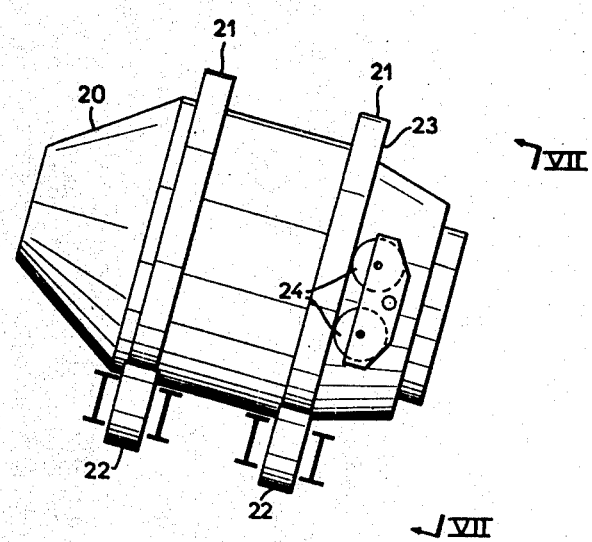
FIG:6
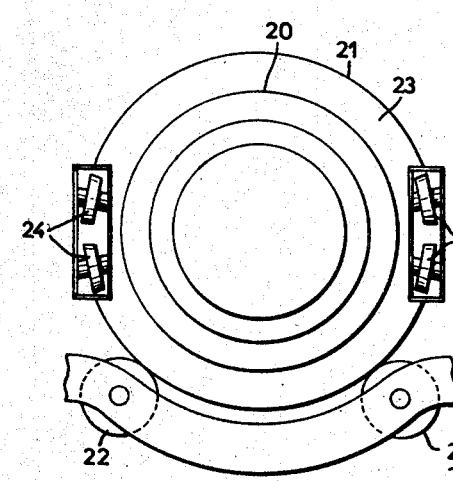
FIG:7
Inventors:
Jacques Jean Caubet
Henri Jacques Grassin
By: Spencer & Kaye
ATTORNEYS May 25, 1965 J. J. CAUBET ETAL 3,185,459
DEVICE FOR SUPPORTING A ROTATING BODY
Filed Sept. 30, 1963 5 Sheets-Sheet 4
FIG:8
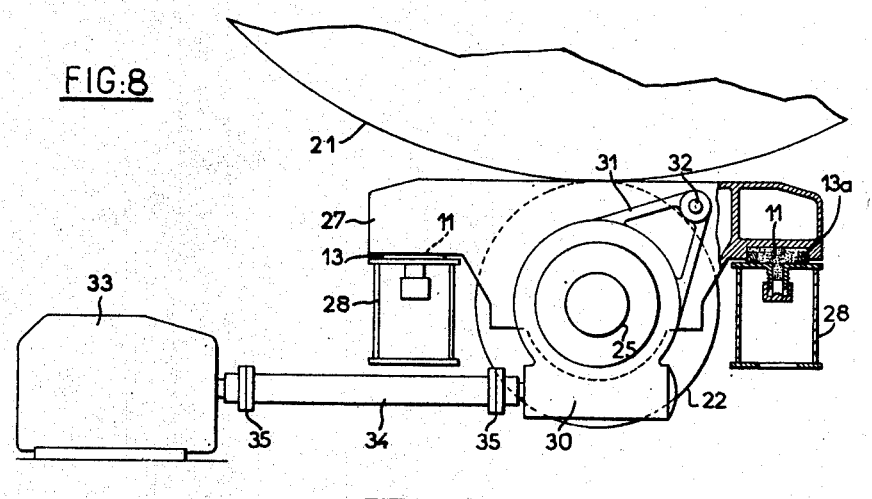
FIG:9
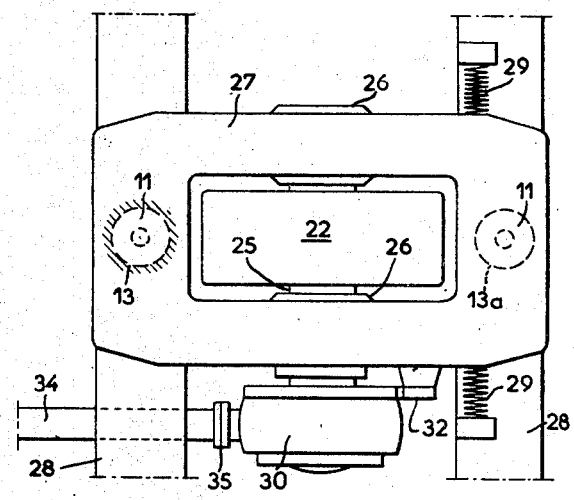
FIG:10
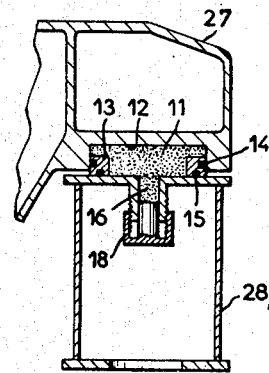
Inventors:
Jacques Jean Caubet
Henri Jacques Grassin
By: Spencer & Kaye
ATTORNEYS

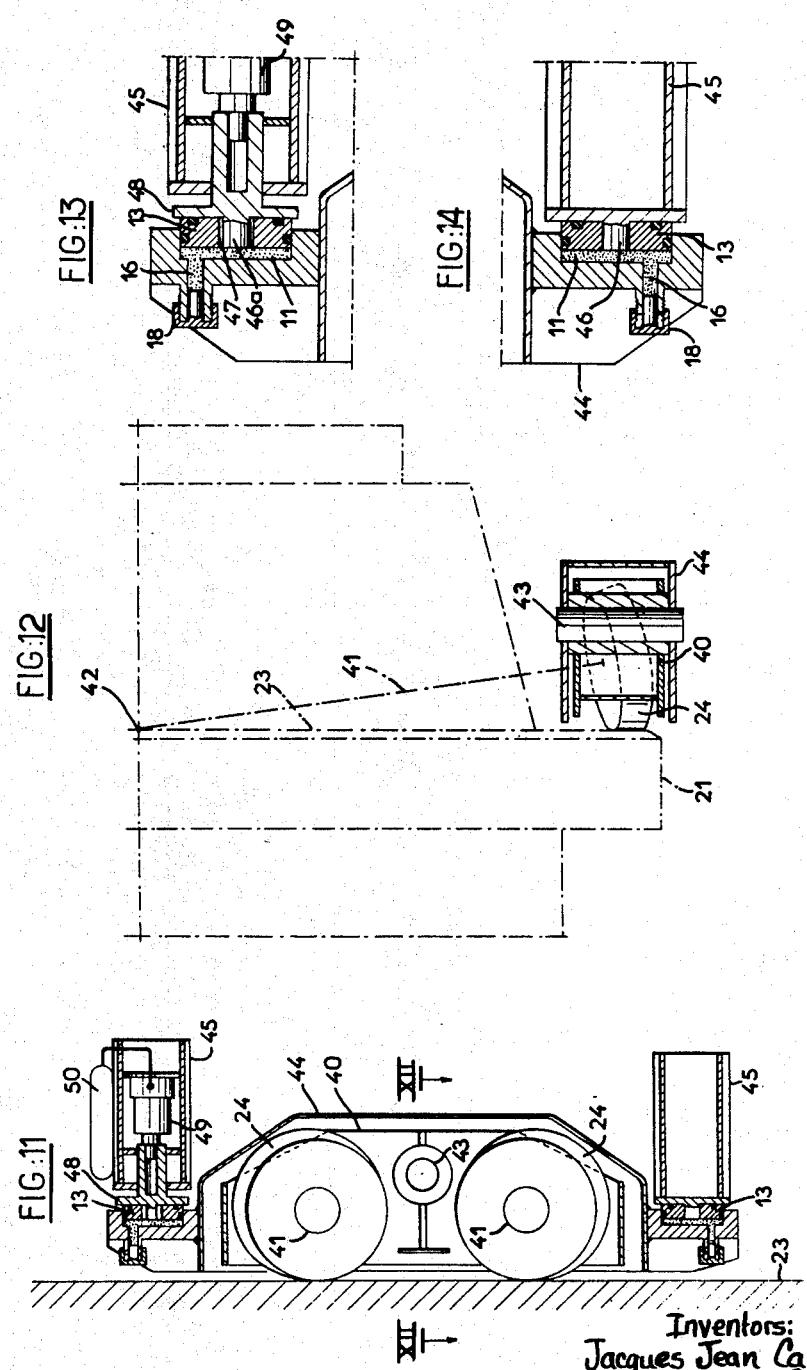

United States Patent Office

3,185,459
Patented May 25, 1965

3,185,459
DEVICE FOR SUPPORTING A ROTATING BODY
Jacques Jean Caubet and Henri Jacques Grassin, Saint-Etienne, France, assignors to Compagnie des Ateliers et Forges de la Loire, Societe Anonyme, Paris, France, and Hydromecanique et Frottement S.A.R.L., Saint-Etienne, France, both corporations of France
Filed Sept. 30, 1963, Ser. No. 312,780
Claims priority, application France, Oct. 2, 1962, 910,999; Jan. 17, 1963, 921,708
16 Claims. (Cl. 263—33)

When a shaft of great length, either in a single piece or reduced to two end journals fixed on each side of a load to be carried, is supported at its extremities by two bearings, and further when, due to the loads which it carries and the temperature variations to which it is subjected, it can take on large deflections and expansions, the design of the said bearings is particularly difficult, especially when the loads are considerable.

Conventional journal bearings mounted without swivel joints lead to difficulties, since the deformations of the shaft give rise at the edges to considerable stresses. With a swivel-joint mounting, the couples necessary for self-alignment are too large with heavy loads to eliminate these stresses in a satisfactory manner. If rigid bearings are mounted instead of sleeve bearings, the results are hardly any better, unless they are considerably over-dimensioned.

A further solution consists in utilizing swivel bearings, one of the bearings at least being mounted on rollers. This solution satisfies the requirements of the expansions and deformations of the neutral line.

However, on the one hand this solution is costly, especially when the resultant of the forces applied to the shaft keeps this latter in place, while necessitating only a half-journal bearing. On the other hand, mounting on swivel bearings, which is excellent for complete rotations at speeds of at least about 10 r.p.m. is very little suitable for incomplete revolutions at speeds of the order of one revolution per minute, with prolonged stoppages. In fact, it is sensitive at the fixed positions when these latter are accompanied by vibrations.

The present invention has for its object a device interposed between a bearing and its support, which enables the disadvantages referred to above to be obviated, the said device comprising at least one cushion interposed between a supporting sole-plate and a dished member having its concave portion directed towards the sole-plate, and to which is transmitted the load carried by the bearing, and characterized in that the cushion is constituted by set grease, and in that a closure ring is mounted with play in the edge of the dished member, while being separated from this edge by a sealing joint and being separated from the said sole-plate by a further sealing joint, so that the said dished member can move and incline itself with respect to the sole-plate of the frame, both by the slip of the set grease and by the play in the ring.

The set grease, the consistency of which is similar to that of putty or soft caramel, is not elastic, and follows the so-called laws or rheology rather than the Pascal laws relating to fluids. Its sealing can for that reason be effected by light means of construction, such as the joints referred to above, even when the large pressures developed are taken into account. A cushion of grease of this kind can, by reason of its low coefficient of friction, co-operate effectively in sliding on the sole-plate with respect to which the dished member which retains it may be independent.

By virtue of the device according to the invention, the resistance offered to movements and deflections due to the deformations of the shaft are very small. For this reason, it is possible to employ thin bearing brasses, for example of sintered material, even when these are especially sensitive to overloads at the edges and necessitating a perfect alignment of the shaft.

In accordance with a further aspect, the present invention has also for its object the applications of a device of the kind referred to, not only to a bearing taken individually, but for example, and without this utilization being limitative, to an assembly comprising a shaft and the two bearings which support it, for the purpose of ensuring the self-alignment of this assembly of parts with another assembly of parts of the same kind.

The invention has also for its object a mounting on such devices interposed between a frame and a cradle receiving at least one shaft by one or more bearings.

The invention also has for its object an application of this mounting to a rotary furnace or other installations.

The objects, characteristic features and advantages of the invention will furthermore be brought out in the description which follows below of forms of construction selected by way of example, reference being made to the accompanying drawings, in which:

FIG. 1 represents in longitudinal section a normal bearing of the swivel and roller type;

FIG. 2 is a diagram showing the degree of freedom of this bearing;

FIG. 3 is a view in transverse section of a bearing according to the invention;

FIG. 4 is a diagram showing the degree of freedom of this latter bearing;

FIG. 6 is a view in elevation of a rotary furnace to which is applied the arrangement according to the invention;

FIG. 7 is a corresponding end view taken along the arrows II—II of FIG. 6;

FIG. 8 shows in elevation the mounting of one of the supporting rollers of the drum of the furnace;

FIG. 9 is a corresponding plan view of this mounting;

FIG. 10 is a view to a larger scale of one of the details of the mounting of FIGS. 8 and 9;

FIG. 11 shows in elevation the mounting of the axial supporting rollers of the furnace drum;

FIG. 12 is a view in cross-section of this mounting, taken along the line VII—VII of FIG. 11;

FIGS. 13 and 14 are detail views to a larger scale of constituent parts of the mounting of FIGS. 11 and 12.

Figure 5:
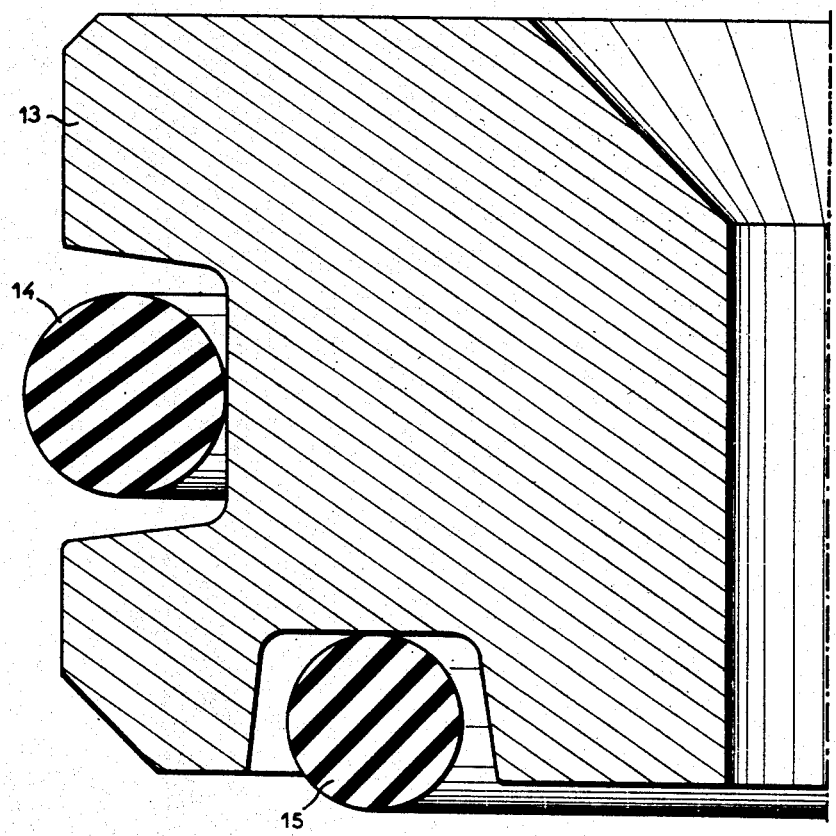
FIG. 5 is a veiw in cross-section to a larger scale of a constituent part of the device according to the invention.

The bearing of known type as shown in FIG. 1 comprises a swivel joint 1 carrying the shaft 2, and the base 3 carrying the swivel joint is mounted on the frame 4 by means of rollers 5. By reason of its degrees of freedom, this bearing complies with the requirements of the expansions and deformations of the neutral line. In fact, it has three degrees of freedom as shown in FIG. 2: a straight-line movement along OY, a rotation about OZ and a rotation about OX.

For certain applications, in particular for incomplete rotations with prolonged stoppages, this expensive bearing is not well suited. On the contrary, the bearing according to the invention, resting on cushions of set grease, gives better results and has more degrees of freedom.

In this bearing, shown in FIG. 3 by way of example only and without limitation, the shaft 6 is carried by a thin bearing bush 9 in the bearing body 7; it is protected by a cap 8. As has been previously stated, the body 7 rests on a supporting base 10 through the intermediary of cushions or blocks 11 of set grease. In the example shown, there have been provided two blocks 11 symmetrical with respect to the vertical axis of the bearing. However, a number greater than two could be provided, aligned perpendicularly to the axis of rotation.

Each block 11 is constituted by a mass of grease housed in the space formed by a cavity 12 provided in the body 7. The cavities 12 are of circular or other shape. Each block 11 is contained by steel rings 13 provided with grooves on their lower and outer faces, these grooves receiving the elastic joints 14 and 15 acting as sealing joints and more particularly shown in FIG. 5.

The play between the ring 13 and its housing 12 is the maximum compatible with good tightness of the joints. This play permits the block of grease to make a movement of rotation at constant volume about one of its diameters, without appreciable resistant force. On the other hand, the blocks 11 can slide on the sole-plate of the base 10. The degrees of freedom of the bearing thus assembled are thus four in number (see FIG. 4):

(1) Any movement in the plane of the sole-plate of the support along OX and OY—two degrees;

(2) Rotation about an axis OZ perpendicular to the sole-plate—one degree;

(3) Rotation about an axis OX forming the line of centres of the blocks—one degree.

The combination of all these movements permits a swivel action to be obtained, the expansion following the neutral line and a movement along an axis perpendicular to this latter in the plane of the sole-plate, this movement being the additional degree of freedom referred to above.

On the other hand, this bearing offers an advantageous possibility of adjustment along OZ, as indicated by the arrow in FIG. 4. In fact, a reserve 16 of grease is provided in the body of the bearing close to each block, and can be expelled by means of a threaded screw 18. As the diameter of the screw is considerably less than that of the block, it is possible to obtain in this way a very precise regulation of height over a substantial travel. This possibility is much superior to that offered by the conventional screw jacks. In fact, the latter only provide regulation at the moment of assembly, since it is not possible to consider their displacement in contact with a steel sole-plate. In the case of the invention on the other hand, the screw acts through the medium of the block of grease which associates simultaneously a gearing-down of the force and the movements with an exceptional coefficient of friction.

The very low value of the resistive moments for all these degrees of freedom enables journal bearings to be employed without overloading the edges. This makes it possible to utilize materials which are sensitive to these overloads but which have on the other hand advantageous properties of friction, such as certain sintered materials, for example.

The bearing thus produced has very many advantages as compared with swivel bearings.

It offers the advantages of the swivel assembly at the cost price of the fixed bearing.

It possesses an additional degree of freedom, as previously stated above.

Its resistive moments for all the degrees of freedom are at most equal to those of bearings.

It permits of the use for the bearing bushes of materials which are particularly sensitive to overloads at the edges, and obviates over-dimensioning in the case of rigid bearings.

Even during operation, it is possible to effect a very precise adjustment of height over an appreciable range, without touching the variation of the base itself.

The base may therefore be of summary construction and approximate alignment, the system according to the invention permitting convenient and accurate alignment to be effected in situ.

A particularly advantageous field of application of the assembly according to the invention is in the steel industry, in which it is required to tilt large loads of considerable dimensions at slow speeds with frequent stoppages. The ambient temperature is frequently high, giving rise to considerable expansion. This is particularly the case with converters.

In a preferred form of construction of a bearing employing a device according to the invention, a shaft of 400 mm. in diameter is supported in a bearing, the sole-plate of which is 1170 mm. in length and 420 mm. in width, and which comprises two circular blocks of set grease of 400 mm. in diameter, having a coefficient of friction of 0.004. The shaft rotates at a speed of 0.1 to 1 revolution per minute and can receive a load of 110 tons. The load on the material which constitutes the bearing bush is 70 kg/sq. cm. A bearing of this kind can pivot through half a degree to the right and to the left. The couples acting in opposition to self-alignment are very small and do not give rise to appreciable overloads.

The form of construction shown in FIGS. 6 and 7 refers by way of example to an application of the invention to a rotary furnace, the drum 20 of which is provided with cylindrical rolling bands 21 resting on rollers 22, known as belt rollers, serving to support and preferably to drive the drum. One of the bands 21 co-operates by one of its lateral faces 23 with rollers 24 which form an axial abutment for the drum.

A furnace installation of this kind is of large dimensions and gives rise to substantial forces. This has the result of creating: difficulties in accurate machining of the heavy and bulky parts which form part of the installation; lack of rigidity of the parts, due to their dimensions and to their method of construction, generally by mechanical welding; and deformation under load together with deformation of thermal origin during the course of operation.

For these various reasons, it is difficult to avoid defects and geometric imperfections in the unit, which is liable to result in high contact stresses on the rollers 22 and 24 and the bands 21, likely to affect their satisfactory performance. To increase the dimensions of the parts in contact with the object of reducing these stresses would be illusory. In particular, an increase in the width of the rollers and the bands would only result in making still more appreciable the defects indicated above.

The device according to the invention is applied to the mounting of the rollers 22 and/or the rollers 24, in order to ensure self-alignment of the surfaces in contact and to prevent concentration of the contact stresses.

Reference will now be made more particularly to FIGS. 8 to 10 which relate to an application of a device according to the invention, to the mounting of the belt rollers 22.

Each roller 22 (FIGS. 8 and 9) is rigidly fixed to a shaft 25 which pivots in bearings 26 carried by a cradle 27 in the form of a frame. This cradle 27 is separate and is supported by each of its extremities by a cross-member 28 of the fixed framework of the furnace, through the intermediary of any appropriate device enabling a swivel effect to be obtained, and preferably the grease cushion device described above, and in which there can be recognized a block 11 of grease held by a ring 13 provided with sealing joints 14 and 15.

The cradle 27 which thus rests by its two extremities on the blocks of grease 11, can oscillate about the common diameter of the two blocks (a horizontal line in the plane of FIG. 8), which makes it possible to ensure coincidence at the point of contact of the generator lines of the rolling band 21 and of the roller 22 with the common tangential plane of the two profiles.

One of the two rings 13 is fixed on its cross-member 28, while the other, having the reference 13a, is entirely free to move along its cross-member 28. The cradle 27 tends to be brought into the central position by a centering means comprising for example springs 29 applied at the extremity of the cradle 27 relative to the free block 13a.

The cradle 27 has thus a latitude of pivotal movement about the fixed block of grease 11. Each roller 22 can therefore follow any possible displacements of the band 21 parallel to the axis of rotation. The lateral slip between the band 21 and the roller 22 is replaced by a slip of the free block 11 on its cross-member 28, which involves frictional forces of a much smaller order.

When the roller 22 is used to drive the drum 20 in rotation, the transmission of the movement can be effected, for example by an endless screw and tangential wheel 30 mounted overhung on the extremity of the shaft 25 of the roller 22. The reaction due to the torque transmitted is absorbed by the cradle 27 by means of an arm 31 coupled at 32 to the cradle 27. This permits the whole of the mechanism 30 to accompany all the movements of the roller 22.

The screw of the mechanism 30 is driven by an electric driving motor 33 through a shaft 34 and internally-toothed couplings 35 for example; the shaft 34 is provided of sufficient length for the angular displacements resulting from the movements of the mechanism 30 to remain within limits acceptable for the couplings 35.

Reference will now be made to FIGS. 11 to 14, which relate to an application of the device according to the invention to the mounting of the abutment rollers 24.

The rollers 24 are of frusto-conical shape and are mounted in pairs on rocking levers 40 judiciously spaced apart along the rolling surface 23. The shaft 41 of each roller 24 is inclined so that the apices of the cones of the various rollers coincide with the centre of rotation 42 of the rolling surface 23. This latter is flat in the example shown.

Any possible displacements of the rollers 24 on this flat surface 23 thus result in little disturbance of the conditions of contact, and in particular less than would be caused between two conical surfaces for example.

Each rocking lever 40 is pivoted on a shaft 43 which is carried by a cradle or cross-member 44. The extremities of the cross-member 44 are supported on girders 45 of the fixed framework, through the intermediary of any device forming a swivel joint, and preferably by the grease-block device 11, according to the present invention. This allows an oscillation of the cross-member 44 about the common diameter of the two blocks 11 (a vertical line in the plane of FIG. 11) which, under the effect of the load, ensures the self-alignment of the generator lines of the rollers 24 with the flat rolling surface 23.

The rings 13 are held in position on the framework 45 by a shaft 46. One of the shafts 46 is fixed while the other, having the reference 46a, can move in an elongated slot 47 in the ring, parallel to the longitudinal axis of the cross-member 44 (a vertical line in the plane of FIG. 11 or of FIG. 13), in order to absorb the effects of expansion. By this means there are obtained: a distribution of the loads on each roller 24 of the same rocking lever 40 by rotation about the shaft 43; a self-alignment of the generator lines of the rollers 24 with the generator lines of the rolling surface 23; a precise adjustment of the mounting of the rollers 24 by regulating the reserves 16 by means of the screws 18.

In addition, according to the invention, means are provided for ensuring a distribution of the total load amongst the various rocking-levers 40. According to these means, one of the extremities of the cross-member 44 is supported through the intermediary of the block of grease 11, on a plate 48. The latter is connected to the fixed framework 45 by a flexible or elastic device such as a spring, Belleville washers, and preferably by the unit formed by a jack 49 coupled to a pre-charged oleopneumatic accumulator 50.

The pre-charge of the accumulator 50 is chosen in such manner that all the rocking-levers 40 balance the drum 20 in all cases in the working position, within the limits of the travel of the jack 49. An instantaneous overload on one of the rocking-levers 40, for example due to the effect of a local deformation of the rolling surface 23, results in a movement of the rod of the jack 49 and an increase in pressure of the corresponding accumulator 50. The energy thus accumulated is restored during the return to normal conditions of working.

It will of course be understood that the invention is not limited to the forms of construction described and shown, but includes all alternative forms coming within its scope.

What we claim is:

1. A device for supporting a body rotating on a base while permitting self-alignment to be effected without appreciable added resistance, in particular under heavy loads, said device comprising: a base; a sole-plate resting on said base; a rotating body support member, said member having a concave surface and a peripheral rim defining the extent of said concave surface, said support member being oriented so that said concave surface is directed towards said sole plate; cushion means constituted by a body of set grease interposed between said sole plate and said concave surface; a closure ring mounted between said sole plate and said concave surface and within the region enclosed by said rim, said ring being dimensioned so as to conform generally to the configuration of said rim and so as to have a degree of play with respect thereof; and a pair of sealing joints associated with said ring, one of said joints bearing against said sole plate so as to maintain a separation between it and said ring and the other of said joints bearing against the inner peripheral surface of said rim so as to maintain a separation between it and said ring; whereby said support member may be both displaced in any horizontal direction and rotated about both a horizontal and a vertical axis with respect to said base due to the sliding action of said set grease and the play of said ring.

2. A device as recited in claim 1, wherein said ring is formed with a pair of grooves extending completely around said ring and wherein each of said joints is seated in a respective one of said grooves.

3. A device as recited in claim 2, wherein each of said grooves is formed in a respective different surface of said ring.

4. A device as recited in claim 1, wherein said rim is of circular shape while said closure ring is of small section so as to give a large sliding-contact surface between said set grease and the sole-plate of said base.

5. A device as recited in claim 1, wherein two said support members, each have a body of set grease interposed between it and said sole plate and each is supported on the sole-plate of said base, said members being symmetrically disposed with respect to an axial plane of said rotating body.

6. A device as recited in claim 1, wherein said support means further comprises means for regulating the volume of said cushion, said regulating means comprising a reserve of set grease in communication with said cushion, and an adjustable screw which is in contact with said reserve.

7. A device as recited in claim 1, for facilitating the self-alignment of a bearing, in which said support member supports the base-plate of said bearing.

8. A device as recited in claim 1, further comprising: a cradle; at least one shaft; and at least one bearing mounted on said cradle and supporting said shaft; said support member supporting said cradle.

9. A device as recited in claim 1, further comprising: a rotary furnace; a plurality of supporting rollers for supporting said furnace; a cradle; and at least two bearings for each roller mounted on said cradle supporting each said roller; said device co-operating with at least one other like device so as to support said cradle.

10. A system as recited in claim 9, wherein the closure ring of the first said device is held fixed on said base, while the closure ring of the second said device is free to slide on said base, said system further comprising centering means applied to the cradle in the zone of the free ring in order to restore said cradle to its central position.

11. A device as recited in claim 9, further comprising a motor provided with an endless screw transmission for driving said rotary furnace, the torque reactions of which endless screw transmission are absorbed by said cradle.

12. A device as recited in claim 1, further comprising: a rotary furnace; at least one cradle; a rocking lever mounted pivotally in each said cradle; and two supporting rollers mounted on each side of the pivotal axis of each said rocking lever and supporting said furnace so as to prevent its axial movement; wherein said device co-operates with at least one other like device for supporting said cradle.

13. A device as recited in claim 12, wherein said rotary furnace comprises at least one rolling surface and said supporting rollers are frusto-conical and work on said rolling surface, the apices of the cones formed by said rollers coinciding with the center of rotation of said rolling surface.

14. A device as recited in claim 12, wherein said rolling surface is flat.

15. A device as recited in claim 12, wherein said device is fixedly mounted with respect to said base, while the other like device is mounted with play so as to absorb the effects of expansion.

16. A device as recited in claim 12, further comprising: a plate; and flexible and elastic means for coupling said plate to said base.

References Cited by the Examiner
UNITED STATES PATENTS

| | | | |
|---|---|---|---|
| 1,385,968 | 7/21 | Newhouse | 308—113 X |
| 2,748,461 | 6/56 | Ohlsson | 308—207 X |
| 2,942,385 | 6/60 | Pal. | |
| 2,976,090 | 3/61 | McFeaters | 308—207 |
| 3,036,823 | 5/62 | Taylor | 263—33 |

CHARLES SUKALO, *Primary Examiner.*

JOHN J. CAMBY, *Examiner.*